US006929788B2

(12) United States Patent
Park et al.

(10) Patent No.: US 6,929,788 B2
(45) Date of Patent: Aug. 16, 2005

(54) METHOD FOR PREPARING LITHIUM MANGANESE SPINEL OXIDE HAVING IMPROVED ELECTROCHEMICAL PERFORMANCE

(75) Inventors: Hong-Kyu Park, Taejeon (KR); Seong-Yong Park, Taejeon (KR); Ki-Young Lee, Taejeon (KR); Joon-Sung Bae, Taejeon (KR)

(73) Assignee: LG Chemical Co., Ltd., Seoul (KR)

( * ) Notice: Subject to any disclaimer, the term of this patent is extended or adjusted under 35 U.S.C. 154(b) by 134 days.

(21) Appl. No.: 09/913,428

(22) PCT Filed: Dec. 15, 2000

(86) PCT No.: PCT/KR00/01470

§ 371 (c)(1),
(2), (4) Date: Aug. 14, 2001

(87) PCT Pub. No.: WO01/44113

PCT Pub. Date: Jun. 21, 2001

(65) Prior Publication Data

US 2002/0136955 A1 Sep. 26, 2002

(30) Foreign Application Priority Data

Dec. 15, 1999 (KR) .......................................... 1999-58066

(51) Int. Cl.$^7$ .............................................. C01G 45/02
(52) U.S. Cl. ....................... 423/605; 423/599; 429/224; 241/23
(58) Field of Search .............................. 429/231.1, 224; 423/599, 605; 241/23; 252/182.1

(56) References Cited

U.S. PATENT DOCUMENTS

| | | | | |
|---|---|---|---|---|
| 4,585,718 A | * | 4/1986 | Uedaira et al. | 429/224 |
| 4,590,059 A | * | 5/1986 | Mellors | 423/605 |
| 4,959,282 A | * | 9/1990 | Dahn et al. | 429/224 |
| 5,277,890 A | * | 1/1994 | Wang et al. | 423/605 |
| 5,523,073 A | | 6/1996 | Sumida et al. | 423/605 |
| 5,702,679 A | * | 12/1997 | Sheargold et al. | 423/599 |
| 5,718,877 A | | 2/1998 | Manev et al. | 423/599 |
| 5,837,030 A | * | 11/1998 | Schulz et al. | 73/352 |
| 6,083,646 A | * | 7/2000 | Sugeno et al. | 429/231.95 |
| 6,248,477 B1 | * | 6/2001 | Howard et al. | 429/224 |
| 6,270,926 B1 | * | 8/2001 | Yamashita et al. | 429/231.1 |
| 6,280,699 B1 | * | 8/2001 | Manev et al. | 423/599 |
| 6,361,755 B1 | * | 3/2002 | Manthiram et al. | 423/599 |
| 6,403,257 B1 | * | 6/2002 | Christian et al. | 429/224 |
| 2002/0141937 A1 | * | 10/2002 | Howard et al. | 423/599 |

FOREIGN PATENT DOCUMENTS

| | | | | |
|---|---|---|---|---|
| EP | 01022792 A1 | * | 7/2000 | |
| JP | 56-045829 | * | 4/1981 | |
| JP | 60-096531 | * | 5/1985 | |
| JP | 61-016473 | * | 1/1986 | |
| JP | 62-126556 | * | 6/1987 | |
| JP | 01263547 A | * | 10/1989 | .......... G01N/27/26 |
| JP | 08102323 A | * | 4/1996 | ............ H01M/4/58 |
| JP | 11-343120 | | 12/1999 | |
| JP | 2000-123876 | | 4/2000 | |
| JP | 2000294239 A | * | 10/2000 | |

* cited by examiner

Primary Examiner—Stanley S. Silverman
Assistant Examiner—Peter J Lish
(74) Attorney, Agent, or Firm—Ladas & Parry LLP

(57) ABSTRACT

The present invention relates to a method for preparing a lithium manganese complex oxide $Li_{1+x}Mn_{2-x}O_4$ (0≦x≦0.12) used as a cathode active material of a lithium or lithium ion secondary battery.

The present invention provides a method for preparing a manganese compound comprising the step of simultaneously applying a mechanical force and heat energy to a manganese compound to remove defects present in particles of the manganese compound and to control the aggregation of particles and the shape of the aggregated particles, a method for preparing a lithium manganese complex oxide with a spinel structure using the manganese compound prepared by the above method as a raw material, and a lithium or lithium ion secondary battery using the lithium manganese complex oxide with a spinel structure prepared by the above method as a cathode active material.

A lithium or lithium ion secondary battery using the lithium manganese complex oxide with a spinel structure prepared from the manganese compound without defects inside particles as a cathode active material has excellent charge/discharge characteristics and cyclic performance.

12 Claims, 6 Drawing Sheets

METHOD FOR PREPARING LITHIUM MANGANESE SPINEL OXIDE HAVING IMPROVED ELECTROCHEMICAL PERFORMANCE

BACKGROUND OF THE INVENTION (a) Field of the Invention

The present invention relates to a method for preparing lithium manganese complex oxide, $Li_{1+x}Mn_{2-x}O_4$ (0×0.12), with a spinel structure used for a cathode active material of a lithium or lithium ion secondary battery.

(b) Description of the Related Art $LiCoO_2$ compound is most commonly used for a cathode active material of a lithium or lithium ion secondary battery having an electric potential of 4 V (voltage). However, many studies for other active materials have been conducted recently, because $LiCoO_2$ compound is expensive and disadvantageous in terms of stability. A lithium manganese complex oxide, $Li_{1+x}Mn_{2-x}O_4$ ($0 \leq x \leq 0.12$), with a spinel structure, is one of the most actively studied materials, because it is inexpensive and stable during its usage, and it has an environmental affinity.

The conventional method for synthesizing lithium manganese complex oxide with a spinel structure comprises mixing a manganese compound and a lithium compound so as to adjust their chemical compositions, and heat-treating the mixture at a high temperature. U.S. Pat. No. 5,718,877 discloses a heat-treatment process for obtaining chemically uniform spinel, and R. J. Gummow et al., Solid State Ionics, 69, 59(1994) state that a compound with a spinel structure is not limited to the stoichiometry of $LiMn_2O_4$, and a spinel structure forms even if x in $Li_{1+x}Mn_{2-x}O_4$ varies from 0 to 0.33, and, as x increases, the valence of Mn reaches 4 and the crystalline structure becomes stabilized.

After it was reported that the deterioration of electrochemical characteristics of lithium manganese complex compound with a spinel structure is promoted by nonuniformity of spinel composition, various studies for synthesizing more chemically uniform spinel using a liquid phase method have been attempted. However, with most liquid phase methods, a spinel compound having a particle size of several µm or less is obtained. Such micro particles are difficult to use as a cathode active material of a battery, because they have poor particle flow characteristics, charge density, tap density, and wettability for solvent, and thus they have many problems in the electrode preparation process, even if each particle has excellent electrochemical properties.

Recently, it was found that defects in raw materials, particularly electrolytic manganese dioxide (EMD), promote nonuniformity of the composition or local defects of structure when synthesizing spinel, and deteriorate the electrochemical properties of spinel. Inside EMD, a raw material of manganese, a variety of defects introduced during the process of synthesis (impurities, absorbed water, crystalline water, hydrogen ions, and other ions such as $SO_4^{2-}$, Cl, $NH^{4+}$, etc.) exist. Such impurities form a stable mesophase that exists as impurities during the heat-treatment process for obtaining the spinel compound of $Li_{1+x}Mn_{2-x}O_4$. In addition, such defects may deteriorate performance when used as a cathode active material of a lithium or lithium ion secondary battery, because the synthesized compound has internal lattice defects, even if it has a spinel structure. Specifically, lithium diffuses into a lattice of a spinel compound when charging/discharging, and the partial lattice defects inhibit the movement of lithium in the process of insertion and deintercalation, as well as react with lithium to decrease the amount of movable lithium, and consequently decreases the capacity of the battery.

There have been many attempts at removing the above-mentioned defects. The most representative method is acid treating or base treating the raw material powder in a strong acid or a strong base. The acid treatment method is used to remove impurity metal ions existing in the raw material, and the base treatment method is used to substitute hydrogen ions in the raw material with lithium. Since these methods are used with aqueous solutions, they involve the risk of moisture infiltration into the raw material and the absorbed water may be incorporated therein. In addition, since particles strongly aggregate after they are dried of the aqueous solution, the above methods involve a pulverizing process, during which process the impurities may be incorporated again, and they have the inconvenience that an acid treatment cannot be conducted simultaneously with a base treatment to remove the impurities.

Another inherent problem is the shape of the secondary aggregate of the manganese raw material. When the mixture of manganese dioxide and lithium compound is heat-treated, lithium infiltrates the manganese compound and a reaction proceeds, and the shape of the formed spinel nearly maintains the shape of the particle of manganese raw material. Therefore, in order to control the shape of the spinel particle, the shape of the particle of manganese dioxide should be controlled.

SUMMARY OF THE INVENTION

It is an object of the present invention to provide a method of preparing a manganese compound having an improved secondary aggregate shape without defects existing in the particles of the manganese compound raw material, in order to obtain a lithium manganese complex oxide with a spinel structure having improved performance, considering the above-mentioned problems of the prior art.

It is another object of the present invention to provide a method of preparing a lithium manganese spinel having improved performance using a manganese compound prepared according to the above method, which has improved particle shape and which does not have internal defects, as the manganese raw material.

It is another object of the present invention to provide a lithium or lithium ion secondary battery having improved electrochemical characteristics using a lithium manganese complex oxide with a spinel structure having improved performance, prepared according to the above method, that is obtained from the manganese compound that has improved particle shape and which does not have internal defects, as a cathode active material.

In order to achieve these objects, the present invention provides a method of preparing a manganese compound that is a raw material for a lithium manganese complex oxide, comprising the step of simultaneously applying a mechanical force and a heat energy to a manganese compound to remove defects present in particles of said manganese compound, and to control the aggregation of particles and the shape of the aggregated particles.

The present invention also provides a method of preparing lithium manganese complex oxide with a spinel structure, comprising the steps of (a) mixing (i) a manganese compound prepared according to the method comprising the step of simultaneously applying a mechanical force and a heat energy to remove defects present inside particles of a manganese compound and to control the aggregation of particles and the shape of the aggregated particles, and (ii) a lithium compound; and (b) calcinating the mixture obtained in said step (a).

The present invention also provides a lithium or lithium ion secondary battery comprising a lithium anode, an electrolyte and a cathode using lithium manganese complex oxide powder with a spinel structure as an active material, wherein said cathode active material is lithium manganese complex oxide with a spinel structure that is prepared by the method comprising the steps of (a) mixing (i) a manganese compound prepared according to the method comprising the step of simultaneously applying a mechanical force and a heat energy to remove defects present inside particles of said manganese compound and to control the aggregation of particles and the shape of the aggregated particles, and (ii) a lithium compound; and (b) calcinating the mixture obtained in said step (a).

DETAILED DESCRIPTION AND THE PREFERRED EMBODIMENTS

The present invention prepares a manganese compound that is a raw material for a lithium manganese complex oxide by applying a mechanical force and a heat energy to remove defects present inside particles of the manganese compound, prepares a lithium manganese complex oxide with a spinel structure using said manganese compound, and provides a lithium or lithium ion secondary battery using said lithium manganese complex oxide with a spinel structure as a cathode active material.

In the present invention, the operation of applying mechanical force and heat energy is referred to as "MH treatment". The mechanical force is applied to a particle of manganese compound raw material, and it produces strain in the aggregated particle to increase driving force that can rearrange the atoms according to their movement. Simultaneously, heat is applied to promote the rearrangement and evaporate absorbed water, water of crystallization, hydrogen ions and other evaporable ions present inside the secondary particles of the raw material.

Such MH treatment may decrease the concentration of defects present in the particles of the manganese compound, thereby increasing the average valence of Mn therein.

The results of MH treatment are proved by the following explanations of the drawings.

Figure 1:
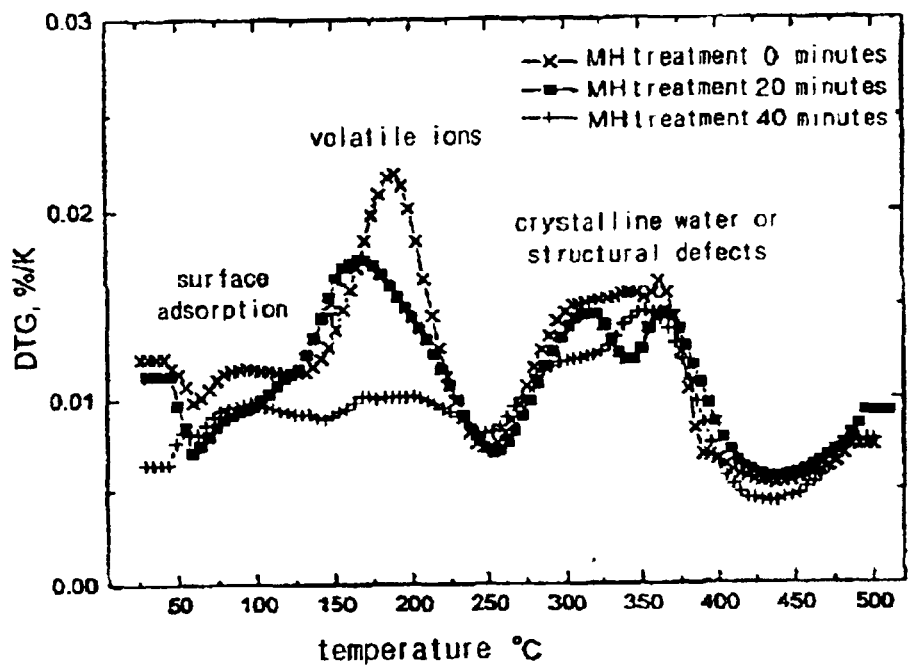
FIG. 1 shows the result of analyzing the distribution of defects present in the particles of MH-treated manganese dioxide using a thermal weight analyzer, according to the amount of time of MH treatment.

FIG. 1 shows the results of analyzing the defects in the particles before and after MH treatment using a thermal gravimetry analyzer, indicating that the total defects largely decrease after MH treatment compared to those before MH treatment.

Figure 2:
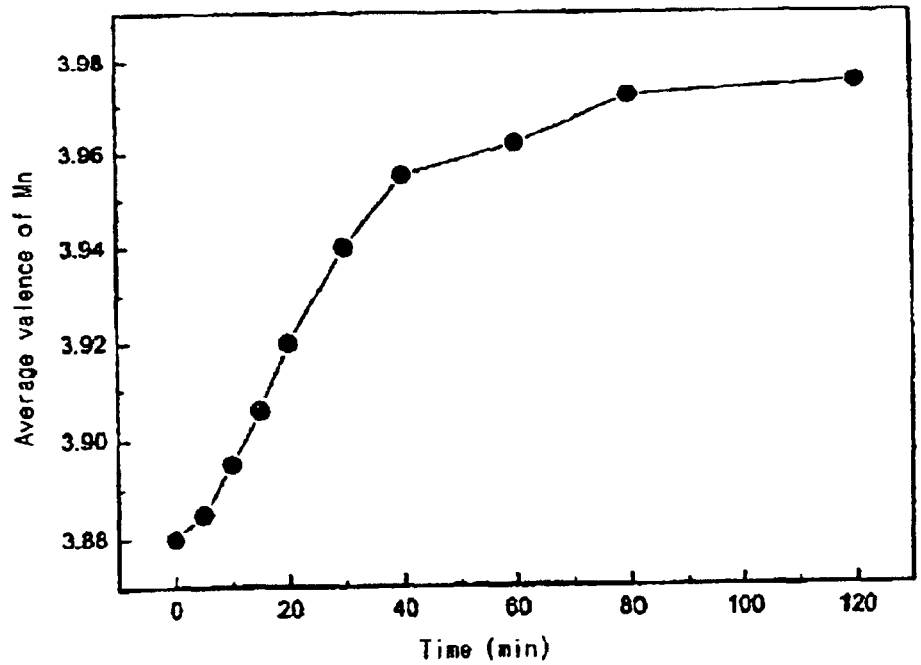
FIG. 2 shows the change of the average valence of Mn in MH-treated manganese dioxide raw material, according to the amount of time of MH treatment.

FIG. 2 shows the average valence of the Mn according to the amount of time of MH treatment, and indicates that, as the amount of time of MH treatment increases, the valence increases. This is because the volatile ions that exist as impurities such as $NH^{+4}$, $H^3O+$, etc. are discharged to increase the valence of Mn.

Figure 3:
FIG. 3 shows a scanning electron microscope (SEM) photograph enlarged 500-fold expressing the shape of particles of manganese dioxide before MH treatment.
Figure 4:
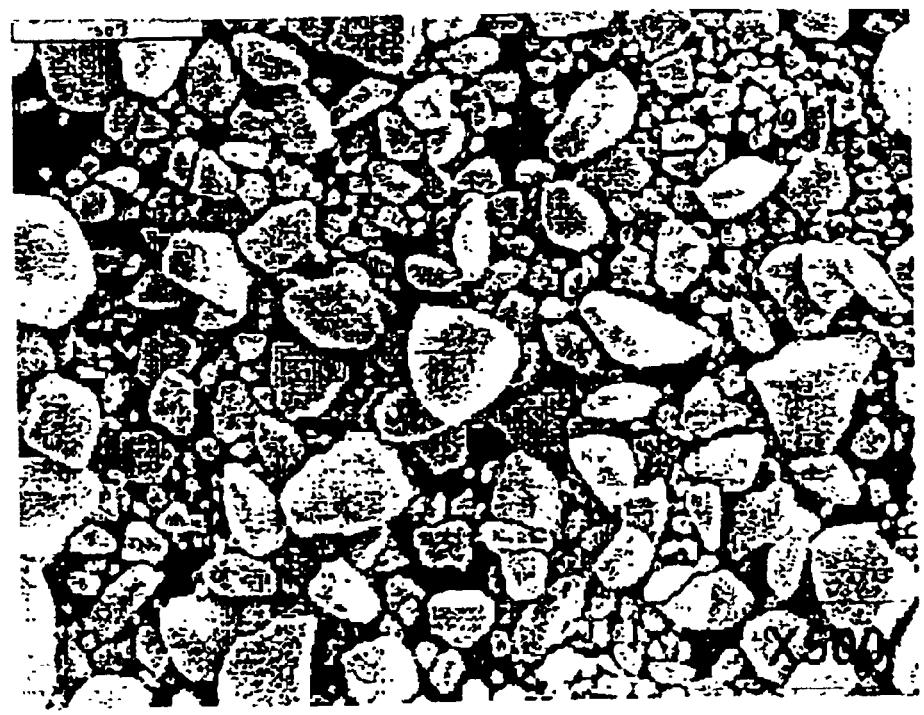
FIG. 4 shows a scanning electron microscope (SEM) photograph enlarged 500-fold expressing the shape of particles of manganese dioxide after MH treatment.

FIGS. 3 and 4 show the shapes of manganese dioxide particles before and after MH treatment, respectively, as seen through a SEM, indicating that the shape drastically changes.

Figure 5:
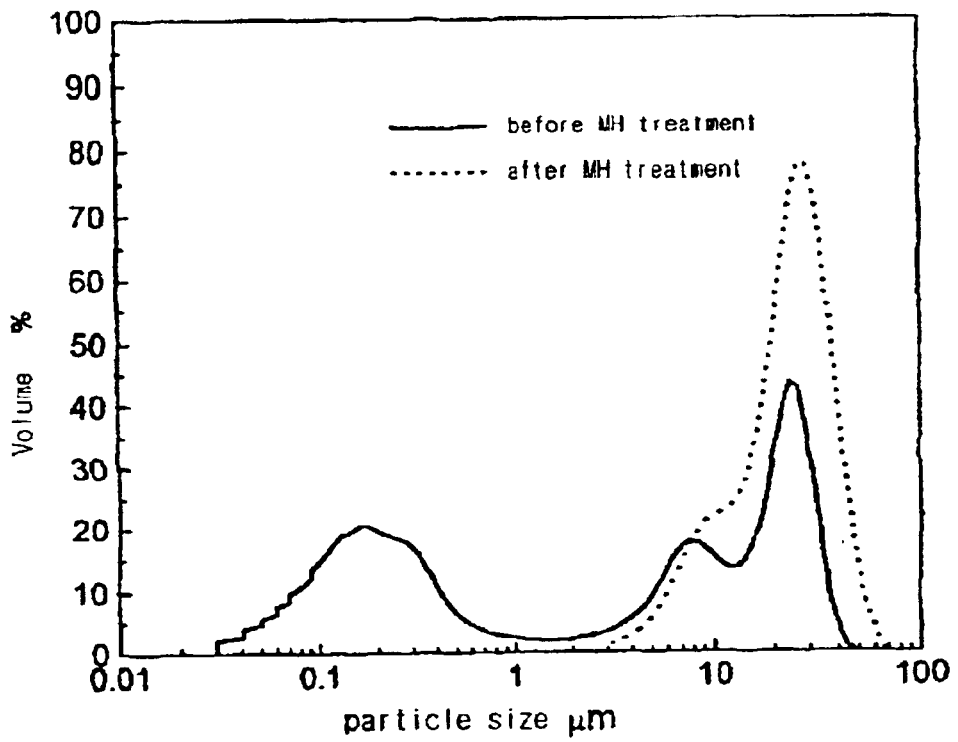
FIG. 5 shows the size of manganese dioxide particles before and after MH treatment and the distribution thereof.

FIG. 5 shows the result of analyzing the size of manganese dioxide particles before and after MH treatment and the distributions thereof using a grading analyzer, indicating that after MH treatment, the size of manganese dioxide secondary particles is suitable for use as a cathode active material.

Such MH treatment of the present invention can be conducted using a specific apparatus that can apply shear stress to the surface of particles, such as a ball mill, attrition mill, jet mill, centrifugal mill, etc., to which a heating apparatus is attached. Such shear stress applies stress to particles to increase a driving force for the movement of atoms in the material, and simultaneously, a heat energy evaporates volatile impurities while promoting the movement of material.

Figure 10:
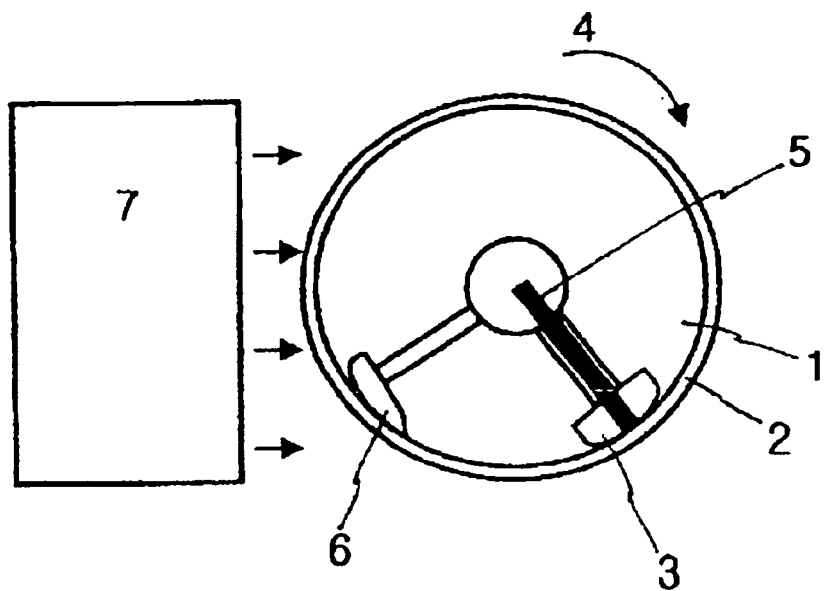
FIG. 10 shows a typical mechanofusion mill, wherein reference numeral 1 indicates a mixing chamber, 2 indicates a chamber wall, 3 indicates a fixing axis, 4 indicates the direction of chamber rotation, 5 indicates a thermoelectric zone, 6 indicates a scraper and 7 indicates an external heater.

A preferable example of said apparatus is surface coating apparatus called "a mechanofusion mill" as used in the Example of the present invention. Said apparatus has the advantage of being capable of applying mechanical force such as shear stress, compression stress, etc. to a particle and externally controlling the temperature, and it is generally used for coating fine metal on ceramic powder. The principle of the operation of said apparatus is shown in FIG. 10. Specifically, the manganese compound raw material, is introduced into the mixing chamber (1), and the manganese compound gathers along the rotating chamber wall (2) by centrifugal force and receives shear stress and compression stress at the fixing axis (3). The scraper (6) scrapes the manganese compound attached to the chamber wall (2), and the thermoelectric zone (5) controls heating of the outer heater (7).

In the present invention, manganese dioxide such as electrolytic manganese dioxide (EMD; $MnO_2$) and chemical manganese dioxide (CMD; $MnO_2$), $Mn_2O_3$ and $Mn_3O_4$ can be used as the raw material.

The mechanical force applied to said manganese compound is preferably approximately 0.1 to 1000 dyne/cm2, in which range the three-dimensional destruction of the aggregated particles does not occur. Since mechanical energy removes edge parts of an angular shaped manganese compound used as the raw material to make it globular, when preparing an electrode from lithium manganese spinel complex oxide that is prepared using a MH-treated manganese compound as a raw material, the surface friction between particles decreases and the true density can be improved. The amount of time of applying mechanical energy and heat energy is preferably 5 minutes to 5 hours. If the time exceeds 5 hours, the particle shape of the prepared manganese compound becomes more spherical, but the disadvantages in terms of operating cost and time are too high. If the time is less than 5 minutes, it is difficult to sufficiently remove defects. The temperature range of heat energy is preferably 50 to 200° C.

In said MH-treatment, preparations that make the treatment easy can be added. Preferable preparations include a lithium salt such as LiOH, $LiOH.H_2O$, $LiCH_3COO$, $LiCHO_2$, $LiCHO_2.H_2O$, $LiNO_3$, and $Mn(CH_3CO_2)_2$, $Mn(NO_3)_2$ and a transition metal salt having a melting point of less than 200° C., and mixtures of other metal compounds and the above compounds. The amount of the preparations is preferably 0 to 20 wt % of the treated manganese compound. In addition, in a method of preparing lithium manganese complex oxide $Li_{1+x}Mn_{2-x}O_4$ (0×0.12) with a spinel structure comprising the steps of mixing lithium compound and said manganese compound and calcinating the mixture, said lithium compound is preferably selected from a lithium salt group consisting of LiOH, $LiOH.H_2O$, $LiCH_3COO$, $LiCHO_2$, $LiCHO_2.H_2O$ and $LiNO_3$. In addition, the temperature of calcination is 400 to 900° C., and the time of calcinations is 1 to 30 hours.

The lithium manganese complex oxide with a spinel structure of the present invention is applied to a cathode active material of a lithium battery or lithium ion battery by mixing lithium manganese spinel compound powder in n-methyl pyrrolidine (NMP) solvent using graphite as a conductor and polyvinylidenedifluoride (PVDF) as a binder to prepare a slurry, coating said slurry on aluminum foil by a casting method, drying said slurry to prepare a cathode, and applying said cathode to a lithium secondary battery together with an anode and an electrolyte. Thus obtained battery has much better charge/discharge characteristics and life characteristics than a battery using a lithium manganese spinel compound prepared from the non MH-treated manganese compound of the prior art as a cathode active material.

The present invention will be explained in more detail with reference to the following Examples and Comparative Examples. However, the Examples are to illustrate the present invention, and the present invention is not limited to them.

EXAMPLE

Example 1

MH Treatment of Manganese Compound Raw Material

In order to remove defects present in electrolytic manganese dioxide (EMD; $MnO_2$), EMD was MH-treated. Specifically, the weight of $MnO_2$ raw material was quantified, and the quantified amount of $MnO_2$ was introduced into a mechanofusion mixer (Japan Kosokawa Company product AM-15) shown in FIG. 10, and shear stress and compression stress were applied to the particles of the raw material while applying 100° C. of heat thereby preparing the modified manganese dioxide.

The change of the distribution of defects present in the particles of MH-treated manganese dioxide (surface absorption, volatile ions, crystalline water, or structural defects) according to the amount of time of MH treatment is shown in FIG. 1.

In addition, the change of the average valence of the Mn according to the amount of time of MH treatment is shown in FIG. 2.

In addition, SEM photographs of the shapes of the particles before and after MH treatment are shown in FIGS. 3 and 4, and the size of the particles and the distribution of the size analyzed by particle size analyzer are shown in FIG. 5.

The Preparation of Lithium Manganese Complex Oxide with a Spinel Structure

The prepared MH-treated manganese dioxide raw material was mixed with lithium hydroxide monohydrate ($LiOH.H_2O$) while controlling the ratio of Mn/Li to 0.538.

The sufficiently mixed powder was heat-treated in a furnace at 400 to 500° C. under an air atmosphere for 7 hours.

The heat-treated powder was cooled and then mixed again in order to make the chemical composition uniform.

Thus obtained powder was secondarily heat treated in a furnace at 750° C. under an air atmosphere to synthesize lithium manganese spinel powder.

Figure 6:
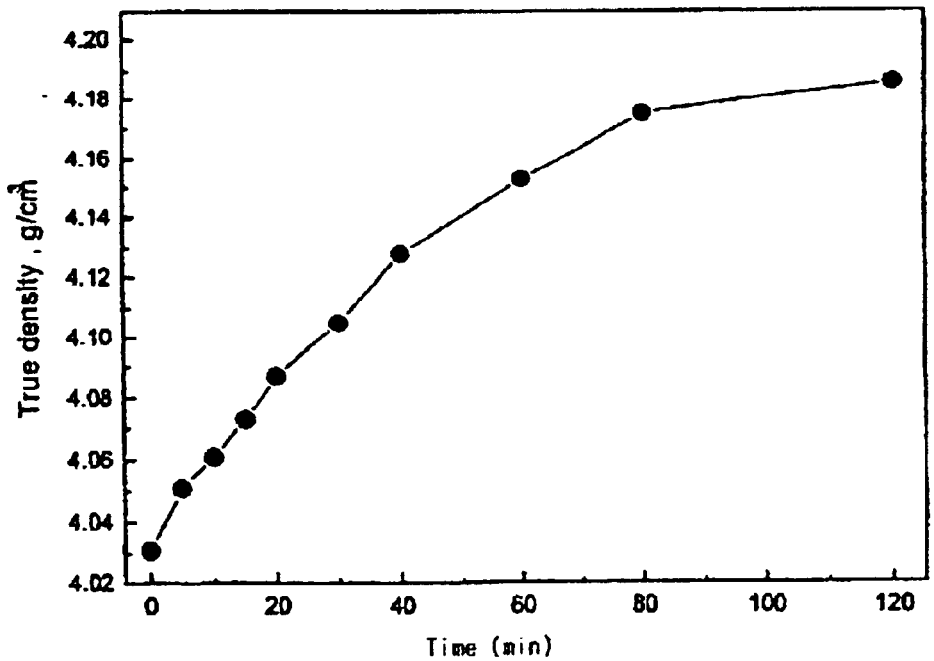
FIG. 6 shows the true density of lithium manganese spinel synthesized using MH-treated raw material, according to the amount of time of MH treatment.
Figure 7:
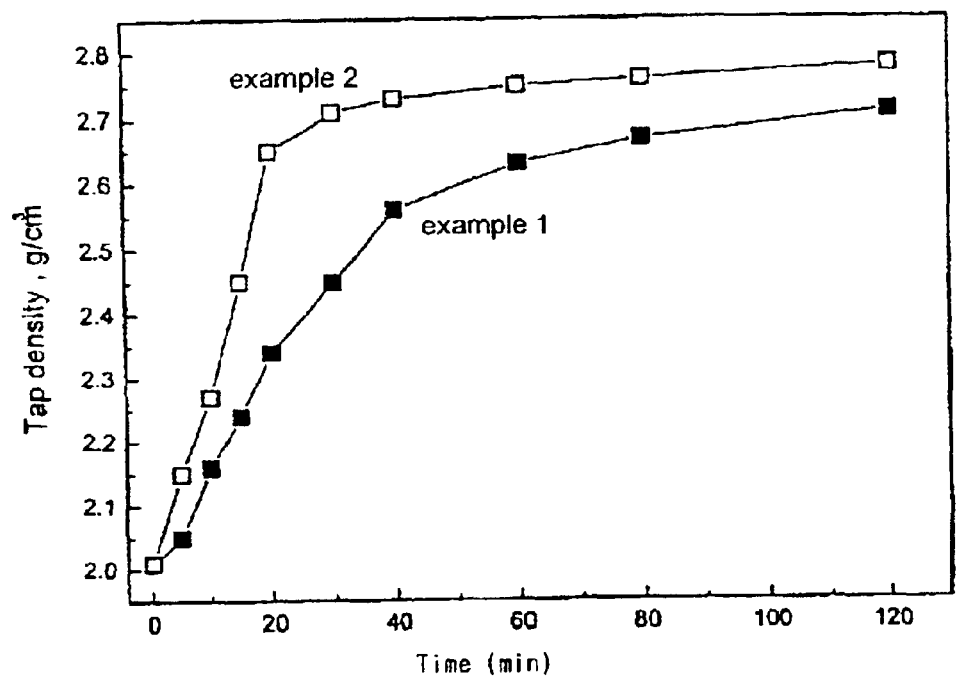
FIG. 7 shows the tap density of lithium manganese spinel synthesized using the MH-treated raw material of Example 1 and Example 2, according to the amount of time of MH treatment.

The change of the true density of manganese dioxide in the prepared spinel powder according to the amount of time of MH treatment is shown in FIG. 6, and the change of the tap density of manganese dioxide according to the time of MH treatment is shown in FIG. 7.

The Application as a Cathode Active Material and the Evaluation of the Battery Characteristics The prepared lithium manganese spinel compound powder was used as a cathode active material to prepare an electrode. Graphite was used as a conductor and polyvinylidenedifluoride (PVDF) was used as a binder. The weight ratio of the active material, conductor and binder was 85:10:5.

A binder was dissolved in n-methyl pyrrolidinone (NMP) and then an active material and a conductor were added to prepare a slurry.

The prepared slurry was coated on aluminum foil by a tape casting method, and then it was dried in a vacuum drier at 130° C. for 2 hours to prepare a cathode.

Lithium metal was used as an anode. The cathode and the anode were cut to an appropriate size, and then a lithium ion secondary battery was constructed as a coin cell. 1 mole of $LiPF_6$ solution was used as an electrolyte, and the mixed solution of ethylene carbonate (EC) and ethylmethyl carbonate (EMC) in the ratio of 1:2 was used as an electrolytic liquid.

The prepared cell was represented by [$LiMnO_2/LiPF_6B$ (1M) in EC+2EMC/Li]. The charge/discharge characteristics and the life characteristics of the cell were evaluated. The evaluation of the capacity was conducted at the range of the charge/discharge voltage of 3.0 to 4.5 V, and the evaluation of the life characteristics was conducted at the range of 3.4 to 4.3 V.

Figure 8:
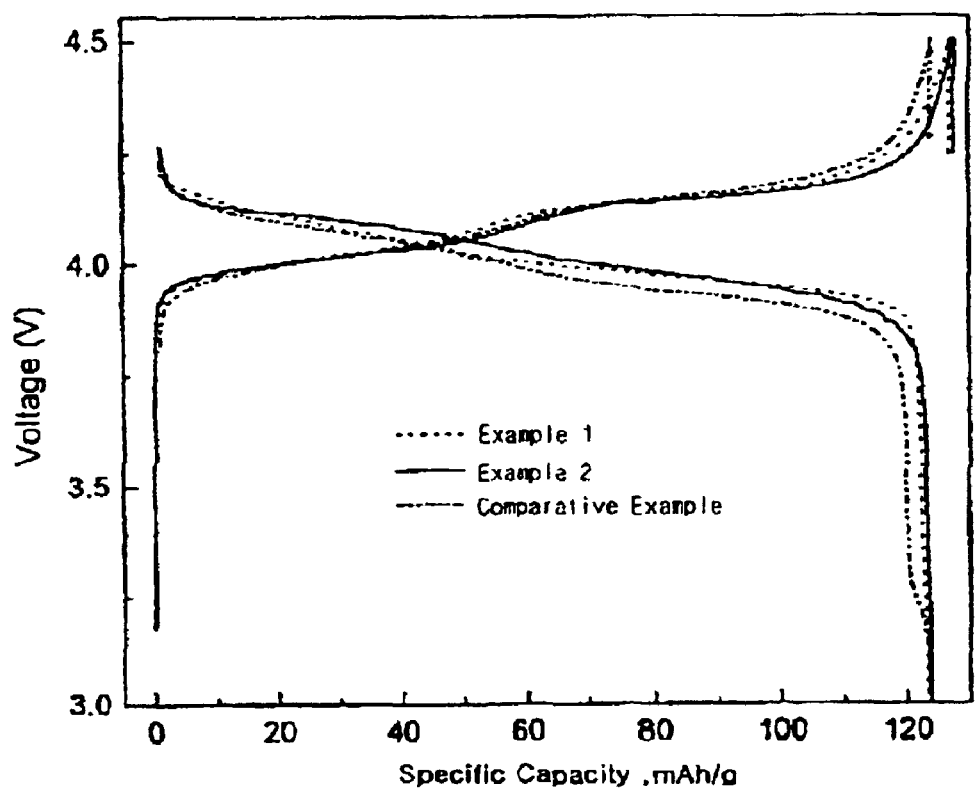
FIG. 8 shows the charge/discharge characteristics of batteries of Example 1, Example 2 and Comparative Example.
Figure 9:
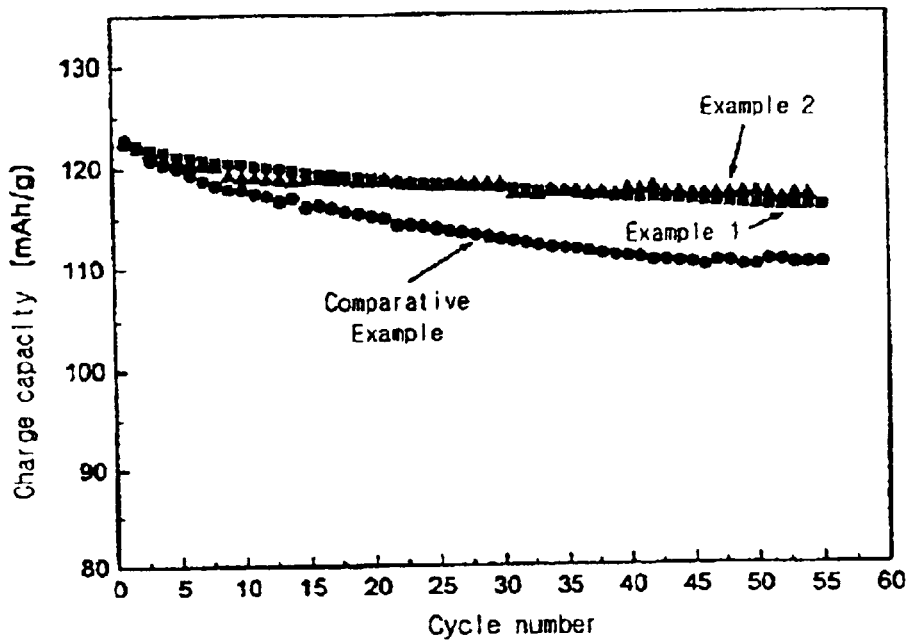
FIG. 9 shows the life characteristics of batteries of Example 1, Example 2 and Comparative Example.

The charge/discharge characteristics are shown in FIG. 8, and the life characteristics are shown in FIG. 9.

Example 2

MH Treatment of Manganese Compound Raw Material

EMD was MH treated by the same method as described in Example 1, except that 0.03 mole of $LiOH.H_2O$ per 1 mole of $MnO_2$ was further added as a preparation to enhance MH treatment.

The Preparation of Lithium Manganese Complex Oxide with a Spinel Structure

Lithium manganese spinel was prepared by the same method as described in Example 1, except that MH-treated EDM to which said preparation was added was used.

The change of tap density of manganese dioxide in the prepared spinel powder according to the time of MH treatment is shown in FIG. 7.

The Application as a Cathode Active Material and the Evaluation of the Battery Characteristics A battery was prepared by the same method as described in Example 1, except that lithium manganese spinel prepared in the above was used as a cathode active material, and the characteristics thereof were evaluated.

The charge/discharge characteristics are shown in FIG. 8, and the life characteristics are shown in FIG. 9.

COMPARATIVE EXAMPLE

The Preparation of Lithium Manganese Complex Oxide with a Spinel Structure

A lithium manganese spinel was prepared by the same method as described in Example 1, except that manganese raw material that was not MH-treated was used.

The Application as a Cathode Active Material and the Evaluation of the Characteristics of the Battery A battery was prepared by the same method as described in Example 1, except that lithium manganese spinel prepared in the above was used as a cathode active material, and the characteristics of the battery were evaluated.

The charge/discharge characteristics are shown in FIG. 8, and the cyclic performance are shown in FIG. 9.

The lithium or lithium ion secondary battery using lithium manganese complex oxide with a spinel structure without defects of the present invention has excellent charge/discharge characteristics and cyclic performance.

What is claimed is:

1. A method for preparing a manganese compound for a lithium manganese complex oxide, comprising simultaneously applying a mechanical force from 0.1 to 1000 dyne/cm$^2$ and a heat energy from 50 to 200° C. at a time from 5 minutes to 5 hours to a manganese compound to remove defects present in particles of said manganese compound, and to control the aggregation of micro particles and the shape of the aggregated particles, wherein the mechanical force and a heat treatment is applied in an apparatus which applies shear stress to the surface of particles and to which a heating apparatus is attached, and the manganese compound gathers along a rotating chamber wall and receives shear stress and compression stress at a fixing axis of the apparatus.

2. The method for preparing the manganese compound according to claim 1, wherein a mechanical force and a heat energy are simultaneously applied to said manganese compound with adding one or more kinds of preparations selected from the group consisting of LiOH, LiOH.H$_2$O, LiCH$_3$COO, LiCHO, LiCHO.H$_2$O, LiNO$_3$, and a transition metal salt having a melting point of 200° C. or less.

3. The method for preparing the manganese compound according to claim 2, wherein the amount of said preparations is 0 to 20 wt % of the manganese compound.

4. The method for preparing the manganese compound according to claim 1, wherein said manganese compound is selected from the group consisting of electrolytic manganese dioxide, chemical manganese dioxide, Mn$_2$O$_3$ and Mn$_3$O$_4$.

5. The method for preparing the manganese compound according to claim 2, wherein said manganese compound is selected from the group consisting of electrolytic manganese dioxide, chemical manganese dioxide Mn$_2$O$_3$ and Mn$_3$O$_4$.

6. The method for preparing the manganese compound according to claim 1, wherein a manganese compound having a shape without edges is prepared from an angular shaped manganese compound as a raw material and applying mechanical force and heat energy.

7. The method for preparing the manganese compound according to claim 2, wherein a manganese compound having a shape without edges is prepared from an angular shaped manganese compound as a raw material and applying mechanical force and heat energy.

8. The method for preparing a manganese compound according to claim 1, wherein the apparatus is a mechanofusion mill.

9. A method for preparing lithium manganese complex oxide with a spinel structure, comprising the steps of:
 a) mixing
  (i) a manganese compound prepared by the method comprising simultaneously applying a mechanical force from 0.1 to 1000 dyne/cm$^2$ and a heat energy from 50 to 200° C. at a time from 5 minutes to 5 hours to a manganese compound to remove defects present in the particles of said manganese compound and to control the aggregation of micro particles and the shape of the aggregated particles, wherein the mechanical force and a heat treatment is applied in an apparatus which applies shear stress to the surface of particles and to which a heating apparatus is attached, and the manganese compound gathers along a rotating chamber wall and receives shear stress and compression stress at a fixing axis of the apparatus; and
  (ii) a lithium compound; and
 b) calcining the mixture prepared in said step (a).

10. A method for preparing a lithium manganese complex oxide with a spinel structure according to claim 9, wherein the (ii) lithium compound of step (a) is selected from a lithium salt group consisting of LiCH, LiOH.H$_2$O, LiCH$_3$COO, LiCHO, LiCHO.H$_2$O and LiNO$_3$.

11. A method for preparing the lithium manganese complex oxide with a spinel structure according to claim 9, wherein the temperature of calcination of said step (b) is 400 to 900° C., and the time of calcination is 1 to 30 hours.

12. A method for preparing the lithium manganese complex oxide with a spinel structure according to claim 10, wherein the temperature of calcination of said step (b) is 400 to 900° C., and the time of calcination is 1 to 30 hours.

* * * * *